(12) United States Patent
Hu et al.

(10) Patent No.: US 6,356,683 B1
(45) Date of Patent: Mar. 12, 2002

(54) OPTICAL FIBER GRATING PACKAGE

(75) Inventors: Chieh Hu, Taichung; Shu-Mei Yang, Taichung Hsien, both of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/454,324

(22) Filed: Dec. 3, 1999

(30) Foreign Application Priority Data

Jun. 14, 1999 (TW) .................................. 88109893 A

(51) Int. Cl.[7] .................................................. G02B 6/34
(52) U.S. Cl. .............................. 385/37; 385/15; 385/31; 359/161
(58) Field of Search ............................... 385/37, 24, 15, 385/31; 359/130, 161

(56) References Cited

U.S. PATENT DOCUMENTS

| | | | |
|---|---|---|---|
| 6,044,189 A | * | 3/2000 | Miller ........................... 385/37 |
| 6,175,674 B1 | * | 1/2001 | Lin ............................... 385/37 |
| 6,181,851 B1 | * | 1/2001 | Pan et al. ...................... 385/37 |

* cited by examiner

Primary Examiner—Darren Schuberg
Assistant Examiner—Fayez Assaf
(74) Attorney, Agent, or Firm—J.C. Patents

(57) ABSTRACT

The invention describes a structure for an optical fiber grating package. The structure has a fiber grating that is mounted on a multi-layer metal plate. The fiber grating is formed on a fiber in the desired portion. Two ends of the fiber grating are secured to the two ends of the multi-layer metal plate. The multi-layer metal plate includes, for example, a bimetal plate and a thinner metal plate on the bimetal plate. The thinner metal plate is used to reduce the thermal expansion effect on the fiber grating. The structure further includes an adjusting plate located on the multi-layer metal plate on the side where the fiber grating is mounted so that the adjusting plate, serving as a pad, can lift the fiber of the fiber grating. The adjusting plate is also located a position between the grating portion of the fiber grating and one secured end of the fiber grating. As a result, a grating pitch of the fiber grating can be further precisely adjusted by shifting the relative location of the adjusting plate to causing a necessary tension of the fiber. The multi-layer metal plate with the fiber grating is held by a metal substrate.

23 Claims, 4 Drawing Sheets

OPTICAL FIBER GRATING PACKAGE

CROSS-REFERENCE TO RELATED APPLICATION

This application claims the priority benefit of Taiwan application serial no. 88109893, filed Jun. 14, 1999.

BACKGROUND OF THE INVENTION

1. Field of Invention

The present invention relates to an optical fiber grating package. More particularly, the present invention relates to a structure and manufacturing method for a passive temperature compensated fiber grating package.

2. Description of Related Art

Fiber grating can be used as a sensor in a wavelength measuring system. It also applies to wavelength division multiplexing (WDM), dispersion compensation, laser stabilization, gain flattening of optical amplifiers and so on, in a communication system. However, this is a problem in fiber grating applications. The Bragg wavelength of the fiber grating changes with the environmental temperature or external stress. In order to prevent the above conditions, several methods have been developed. For example, in an optical active system, the environmental temperature is dynamically maintained in a stable condition by a temperature control system, so as to maintain a stable central wavelength of the fiber grating. This active method has a drawback in that it consumes power when controlling the temperature. Another choice is to employ a passive system, which structure is less complex than the active system. The optical passive system can be made insensitive to temperature through a thermal compensation mechanism.

In the region where the fiber grating is located, the refraction index and the pitch of the fiber grating are inevitably affected by the temperature. The refraction index of the grating is usually very sensitive to temperature and thus hard to control. The control method in the passive system typically makes use of the expansion property of the material, which expansion property varies with the temperature. The central wavelength of the fiber grating therefore can be controlled by temperature. A ceramic material with a negative coefficient of thermal expansion (CTE) proposed by U.S. Pat. No. 5,694,503 is currently in use for compensation of the temperature effect in the passive system. This method has the advantages of small device dimensions and a simple structure, but it has at least one drawback in that the ceramic material is easily broken. Moreover, the negative CTE of ceramic material must be accurately controlled during fabrication.

In U.S. Pat. No. 5,042,898, two kinds of material with different but positive CTEs are used. The two materials are affixed together to form two tubes. Two ends of the fiber are respectively affixed to the two tubes of the materials. As temperature increases, the fiber length is loosened by the material with the larger CTE through release of the fiber so as to achieve thermal compensation. The central wavelength of the fiber grating therefore can be kept the same. The drawback of this method is that very high precision is necessary when affixing the fiber onto the two kinds of material. If such precision is not met, the compensation of expansion will fail.

Another method, using the plates made of two kinds of materials, is also proposed by patent WO98/27446. The fiber grating is fixed on the plate having a smaller CTE. As temperature increases, the plate becomes concave due to the difference of CTE between the two kinds of material, so that the fiber grating can be compensated. This method also has its drawback.

In the patent WO98/27446, quartz is used as the low CTE material, but it is difficult to bend quartz bends. As a result, temperature compensation is difficult to perform. Moreover, if the two plates are not properly fixed together, the thermal stress cannot be properly released. The reliability of the fiber grating package is reduced. In addition, a thin ion plate is used as the higher CTE plate. The temperature compensation of the thin ion plate is adjusted by its width. The device dimension cannot be effectively reduced.

In U.S. Pat. No. 5,841,920, a similar principle is applied in which two material elements with different CTEs and different geometric structures are used. By making use of the different CTEs and geometric structures, the material distorts to compensate for the fiber grating. This method still has a drawback in that an external impulse may shift the fiber grating, indirectly influencing the temperature compensation. Moreover, the method cannot allow adjustment of the fiber grating once the fiber grating is adhered, affixed or packaged on the element. This causes a low yield when a filter device is assembled.

As WDM transmission technology continues to develop, a precise and stable wavelength for transmission is essential. It becomes an important issue to have a precise and stable wavelength. The typical temperature coefficient of the fiber grating is about 0.01 nm/° C., which is insufficient for the requirement in the WDM transmission. Moreover, as the channel number of the WDM increases, the channel spacing is reduced from 1.6 nm down to 0.4 nm. In the current WDM transmission technology, the wavelength precision is very important. The central wavelength of the fiber grating demands an error within +/−0.025 nm. It is very important to precisely control the central wavelength of the fiber grating during packaging the fiber grating.

SUMMARY OF THE INVENTION

It is at least an objective of the invention to provide an improved structure for an optical fiber grating package, such that the packaged fiber grating and signals reflected or transmitted from the fiber grating are insensitive to the environmental temperature. The central wavelength of the fiber grating is therefore not affected by the environmental temperature. After packaging, the central wavelength of the fiber grating meets the specifications of the International Telecommunication Union (ITU). In addition, a method for fabricating the structure of the optical grating package is also provided so as to allow the structure to easily meet the specifications of the ITU. Adjustment of the central wavelength can be performed when the structure is on-line, resulting in a high yield of product.

The invention provides a structure for an optical fiber grating package. The structure includes a fiber grating that is mounted on a multi-layer metal plate. The fiber grating is formed on a fiber at the desired portion. The ends of the fiber grating are secured to the two ends of the multi-layer metal plate. The multi-layer metal plate includes, for example, a two-layer metal plate and a thinner metal plate on the two-layer metal plate. The two layers of the bimetal plate have different coefficients of thermal expansion (CTE). The thinner metal plate usually is, for example, about 10 times thinner than each of the two layers. The thinner metal plate is adhered to, for example, the one of the two layers with the greater CTE by a contact length, which is adjustable so as to compensate the CTE of bimetal plate. The structure further includes an adjusting plate located on the multi-layer metal plate at the side where the fiber grating is mounted so that the adjusting plate, serving as a pad, can lift the fiber of the fiber grating. The adjusting plate is also located in a position between the grating portion of the fiber grating and one fixed end. As a result, a grating pitch of the fiber grating can be further precisely adjusted by shifting the relative location of the adjusting plate to cause a necessary tension of the fiber. The multi-layer metal plate with the fiber grating is held by a substrate, such as metal substrate. The metal substrate is located in a tube casing, for example, for protection. Tube caps cover both ends of the tube so that the metal substrate is protected by the tube casing. Each cap includes, for example, an aperture to allow the fiber to pass through.

The invention also provides a method for fabricating the optical fiber grating package. The method includes providing a bimetal plate, which is planar at a packaging temperature of, for example, about 100° C. This temperature is relatively higher than the normal environmental temperature. A thin metal plate is adhered to the bimetal plate at one side so that a multi-layer metal plate is formed and has a substantially flat structure at the packaging temperature. A desired contact length between the thin metal plate and the bimetal plate is set, according to design requirements for compensating the CTE of the bimetal plate. This structure is now called a multi-layer metal plate. A fiber grating portion of a fiber, whose central wavelength is adjusted to a desired value, is secured to the two ends of the multi-layer metal plate. An adjusting plate is inserted between the fiber and the multi-layer metal plate and is located between the fiber grating portion and one of the two ends. The adjusting plate is used to further adjust the central wavelength of the fiber grating. The multi-layer metal plate with the fiber grating is mounted on a substrate. A portion of the fiber other than the fiber grating portion is also attached to the two ends of the substrate with a reserved additional length, so that the fiber between the multi-layer metal plate and the ends of the substrate is not pulled due to a mechanical effect such as a distortion of the multi-layer metal plate as the environmental temperature changes. The substrate is further inserted in a tube casing, which is then covered with two end caps. Each end cap has an aperture through which the fiber passes.

The invention uses a multi-layer metal plate to hold a fiber grating so as to reduce the thermal effect on the fiber grating. An adjusting plate is also used to further adjust the central wavelength of the fiber grating. The central wavelength therefore remains stable as environmental temperature varies.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Material can physically linearly expand or contract as its temperature varies. The coefficient of thermal expansion (CTE) is a typical material constant, which can be timed with a temperature difference to determine a dimension difference. The dimension difference can also determine the temperature difference because they are proportional.

Metallic material is usually sensitive to the temperature and different metallic materials have different CTEs. If two metal layers of different materials are adhered together as a bimetal plate, the two metal layers have different expansion rates as the temperature varies. As a result, the bimetal plate is distorted as its temperature changes due to the different CTEs.

Figure 1A:
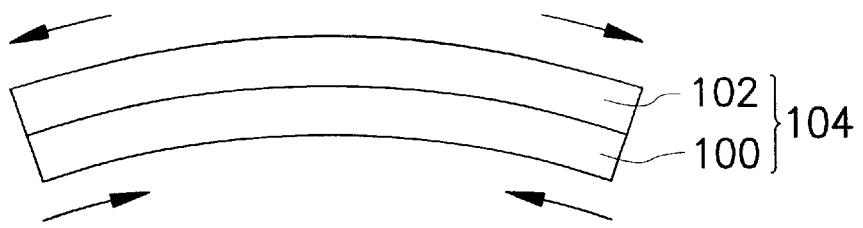
FIGS. 1A and 1B are cross-sectional views, schematically illustrating distortion of a bi-metal plate as temperature changes.
Figure 1B:
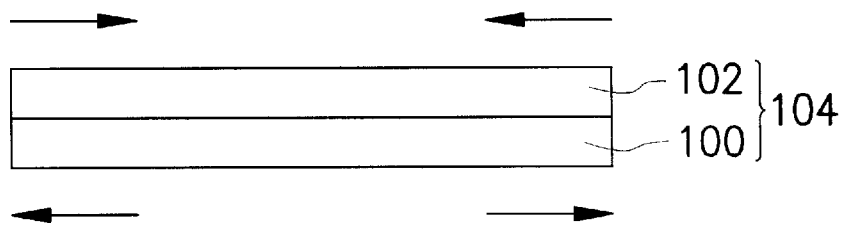

FIGS. 1A and 1B are cross-sectional views, schematically illustrating distortion of a bimetal plate as temperature changes. In FIG. 1A, the bimetal metal plate 104 includes a metal layer 100 with a greater CTE and a metal layer 102 with a smaller CTE. As temperature decreases, the contraction rate of the metal layer 102 is smaller than the contraction rate of the layer 100. Since the layers 100, 102 are adhered together, a shearing stress exists at their interface. The arrows on the layer 102 indicate the directions in which distortion occurs as temperature is reduced. The contraction rate of the layer 100 is sufficiently larger and layer 102 is therefore bent by the interface with layer 100. As a result, the bimetal plate 104 is distorted into a concave shape. As the temperature of the bimetal plate 104 is raised to a certain level, the distortion disappears, since the layer 100 has larger expansion rate than that of the layer 102. The bimetal metal plate 104 becomes flat at a higher temperature. These effects are natural physical phenomena.

In more detail, the actual expansion rate can be described as curve rate A, which is a shift distance of one end to a tangential line of the middle point on a circular curve as the bimetal plate 104 is circularly distorted at a low temperature. The curve rate A is derived as:

$$A = \frac{a \cdot dT \cdot L^2}{4S}, \qquad (1)$$

where α is a deflection constant in K$^{-1}$, including the CTE and other possible linear parameters. dT is the temperature difference, L is the length of the bimetal plate, and S is the thickness of the bimetal plate. The quantity of the curve rate A indicates the tilted distance on one end, while the middle point is treated as fixed point. The deflection constant usually is about 5.5–21 for a commercial product, which amount depends on the different materials used for the two layers 100 and 102. The curve rate A is linearly proportional to the temperature difference and can be used to determine the temperature.

According to the theory of material mechanics, as a material is curved due to a shearing stress, the material suffers a strain. The strain of the material along the x-axis is shown in Eq. 2:

$$\varepsilon_x = \alpha \cdot dT + \frac{\sigma_x}{E} = \alpha \cdot dT + \varepsilon_B, \quad (2)$$

where $\varepsilon_x$ is the total strain along the x-axis, $\alpha$ is the CTE, $\sigma_x$ is the shearing stress along the x-axis, E is the elastic modulus, and $\varepsilon_B$ is surface strain of the bimetal plate 104.

The above thermal effect induced by the temperature difference can be used for thermal compensation in the fiber grating. For the usual product on the market, the deflection constant a is provided. The parameter $\varepsilon_B$ can be related to the deflection constant a by Eq. 3:

$$\varepsilon_B = \frac{2 \cdot a \cdot dT \cdot y}{S}, \quad (3)$$

where y is the distance between a neutral surface and an active surface. Eq. 3 provides information necessary for selection of a desired bimetal plate 104.

The bimetal plate is widely used by industry, so its price is low and its reliability is high. However, the available product is not suitable for use with a fiber grating. The invention therefore chooses a bimetal plate with a CTE greater than the actual need of the fiber grating. Then the invention employs an additional metal plate with a certain CTE and adheres it on one layer of the bimetal plate so as to adjust the compensation rate. The additional metal plate is preferably adhered on the layer with greater CTE.

Figure 2:
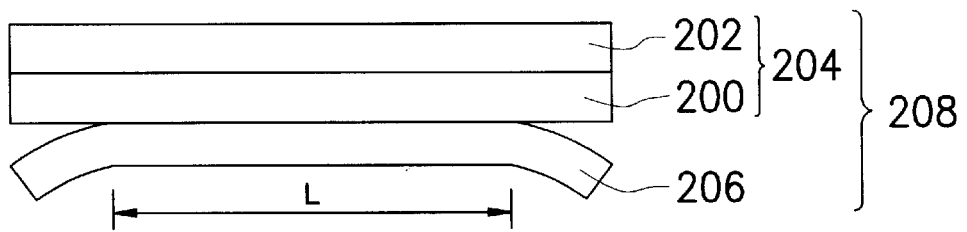
FIG. 2 is a cross-sectional view, schematically illustrating a multi-layer metal plate used in a passive temperature independent fiber grating package, according to a preferred embodiment of the invention.

FIG. 2 is a cross-sectional view, schematically illustrating a multi-layer metal plate used in a passive temperature independent fiber grating package, according to a preferred embodiment of the invention. In FIG. 2, a bimetal plate 204 like the one shown in FIG. 1A includes a layer 200 with a higher CTE and a layer 202 with a lower CTE. The thickness of the bimetal plate 204 is about 0.2 mm, and the width is usually about 2 mm so that the plate is a thin strip with a length, for example, of 30 mm. The additional metal layer 206, also called a third metal layer 206 if layer 200 is called the first metal layer, and layer 202 is called the second layer, is preferably adhered to the first layer 200 having the higher CTE by a contact length L. The third metal layer 206 preferably is thinner than each of the two layers 200, 202 of the bimetal plate 204. The third metal layer 206 preferably includes stainless steel and is about 0.03 mm thick. The third metal layer 206 together with the bimetal plate 204 form a multi-layer metal plate 208 of the passive temperature independent fiber grating package of the invention.

The contact length L between the third metal layer 206 and the first metal layer 200 is used to control and monitor a net thermal compensation of the main-body plate 208. The thermal compensation can be adjusted by optimizing the contact length L. The contact length can be changed by, for example, stripping both ends of the third metal layer 206 away from the first metal layer 200. The dimensions of the bimetal plate 204 are, for example, the typical dimensions of the available commercial product. In actual application, the dimensions of the bimetal plate 204 can vary with the design, and the third metal layer 206 can also be adhered to the metal layer 202.

After a fiber grating is formed on a desired portion of a fiber, the fiber grating must be fixed on a multi-layer metal plate 208. A desired shape of the bimetal plate is a concave structure at normal temperatures, where the layer with low CTE serves as the outer layer. The fiber grating is secured on the multi-layer metal plate as follows. Also referring to FIG. 2, at a stable packaging temperature such as 100° C., the bimetal plate 204 is flat. The third metal layer 206 is adhered to the layer 200 with a high CTE with, for example, thermal glue. There is a contact length L. The third metal layer 206 includes, for example, stainless steel with a thickness of about 0.03 mm. The purpose of the third metal layer 206 is to preliminarily adjust the CTE of the bimetal plate 204 to a desired quantity, according to design. The adjustment is necessary because the bimetal plate 204 is a commercial product with a specified CTE.

Since the CTE of the third metal layer 206 is usually not much different from that of the bimetal plate 204, the third metal layer 206 can be firmly glued on the layer 200 and generates less shearing stress at 100° C. The reliability remains at a high level.

The portion of fiber having the fiber grating (not shown in FIG. 2 but shown in FIG. 3) is mounted on the metal layer 202 at both ends so that the fiber grating is located on the side with the low CTE. The central wavelength of the fiber grating is adjusted to the desired wavelength that meets the specification of the ITU.

Since the normal working temperature is usually within a certain range lower than the packaging temperature, as the temperature decreases to the normal temperature, the multi-layer metal plate 208 becomes convex toward the side having the lower CTE. This is a natural physical effect due to the contraction of the layer 200 with the high CTE. This phenomenon is described in FIG. 1.

Figure 3:
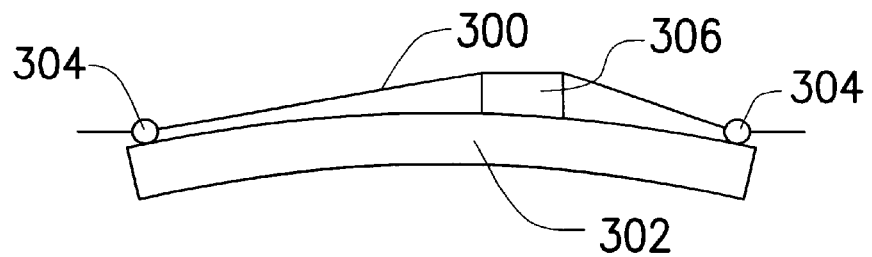
FIG. 3 is a cross-sectional view, schematically illustrating a fiber grating on the passive temperature independent fiber grating package, according to the preferred embodiment of the invention.

FIG. 3 is a cross-sectional view, schematically illustrating a fiber grating on the passive temperature independent fiber grating package, according to the preferred embodiment of the invention. In FIG. 3, the multi-layer metal plate 302 is similar to the one in FIG. 2 but stays at a lower temperature. The top surface of the multi-layer metal plate 302 is on the side of the layer 202 with the lower CTE. Both ends 304 of the grating portion of a fiber 300 are fixed on the multi-layer metal plate 302. An adjusting metal plate 306 is also used to further adjust the central wavelength of the fiber grating. The adjusting metal plate 306 is inserted between the fiber 300 and the multi-layer metal plate 302 so that the fiber 300 is lifted up. The adjusting metal plate 306 is located between the grating portion and one of the ends 304. Different locations of the adjusting metal plate 306 can generate different tensions of the fiber. This allows a more precise adjustment of the grating pitch. The central wavelength is therefore more precisely adjusted.

Figure 4A:
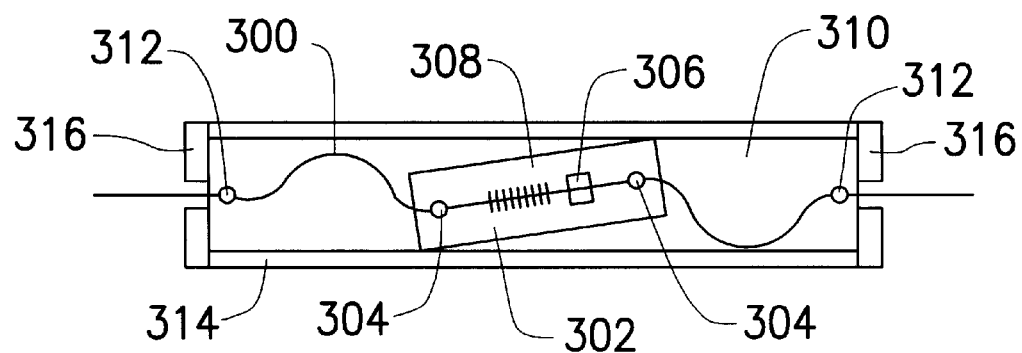
FIG. 4A and FIG. 4B are a top view and a cross-sectional view, schematically illustrating the p tempera e independent fiber grating package, implemented in a tube casing for protection, at a packaging temperature, according to the preferred embodiment of the invention.
Figure 4B:
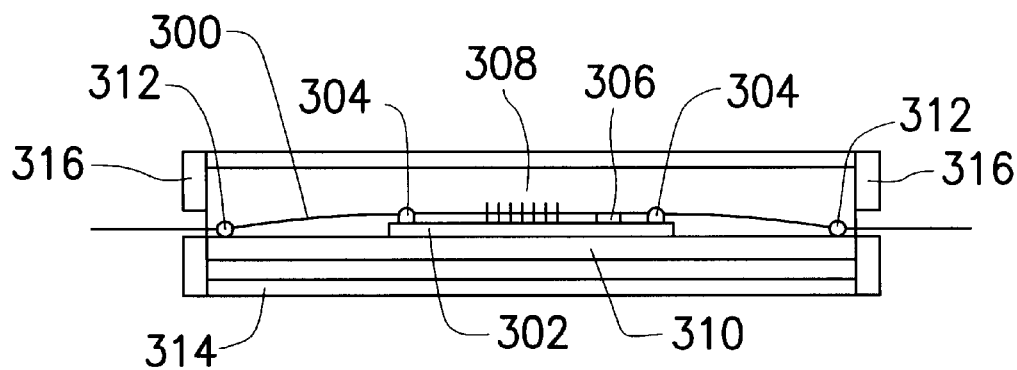

At this stage, the fiber grating is mounted on the multi-layer metal plate 302 of the invention. For the practical use, it is still necessary to mount the multi-layer metal plate 302 on a metal substrate, which is further mounted in a protection casing, such as a tube casing. FIG. 4A and FIG. 4B are a top view and a cross-sectional view, respectively, schematically illustrating the passive temperature independent fiber grating package implemented at a packaging temperature in a tube casing for protection, according to the preferred embodiment of the invention.

In FIG. 4A and FIG. 4B, the multi-layer metal plate 302 with the fiber grating is mounted on a metal substrate 310, and is put in a tub casing 314. The fiber grating 308 is indicated by a portion of grating on the fiber 300. The adjusting plate 306 is inserted, for example, during a packaging period. The multi-layer metal plate 302 is mounted on a substrate 310, which preferably is metallic. The substrate 310 is further mounted on the tube casing 314. Both ends of the tube casing 314 are covered by caps 316. Each cap 316 has an aperture to allow the fiber 300 to enter the tube casing 314 so that the fiber grating is protected by the tube casing 314. The fiber grating 308 is affixed to the ends 304 on the multi-layer metal plate 302. The substrate also has two ends 312, not part of the grating portion, by which the fiber is secured. Since the multi-layer metal plate 302 contracts as temperature is reduced, the fiber length at the portion between the ends 304 and the ends 312 includes a reserved length to make the fiber sufficiently long so as to avoid pulling the fiber 300 due to different temperatures or other mechanical factors. FIGS. 4A and 4B show the fiber grating 308 in the tube casing 314 at the temperature 100° C. The multi-layer metal plate 302 remains flat.

Figure 5A:
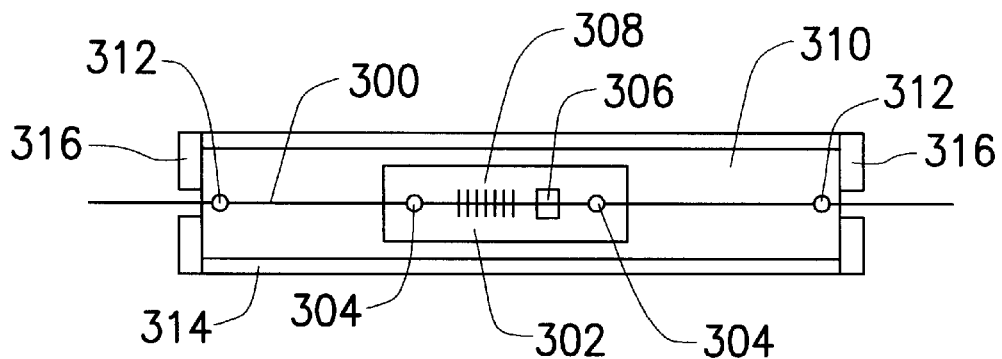
FIG. 5A and FIG. 5B are a top view and a cross-sectional view, respectively, schematically illustrating the passive temperature independent fiber grating package, implemented in a tube casing for protection, at a normal working temperature, according to the preferred embodiment of the invention.
Figure 5B:
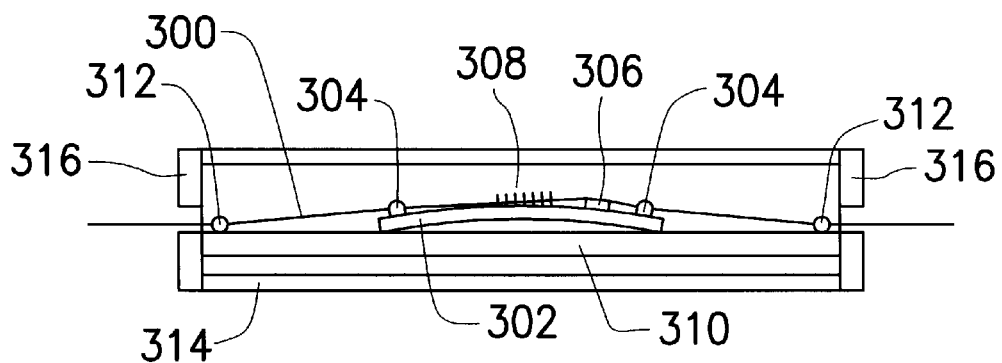

As the temperature is reduced from the packaging temperature, the multi-layer metal plate 302 becomes convex as shown in FIG. 5B. FIG. 5A and FIG. 5B are a top view and a cross-sectional view, respectively, schematically illustrating the passive temperature independent fiber grating package implemented at a normal working temperature in a tube casing for protection, according to the preferred embodiment of the invention. In FIG. 5B, the convex structure of the multi-layer metal plate 302 is shown. Since the temperature dependence of the Bragg wavelength in the fiber grating 308 is compensated by the multi-layer metal layer 208 (FIG. 2) and the central wavelength is finely tuned by the adjusting metal plate 306, the central wavelength does not vary away from the desired quantity at the normal temperature. Moreover, the fiber 300 at the portion between the ends 304 and the ends 316 is stretched but not overly stretched or broken due to the reserved length. The passive temperature independent fiber grating package is therefore formed.

Figure 6:
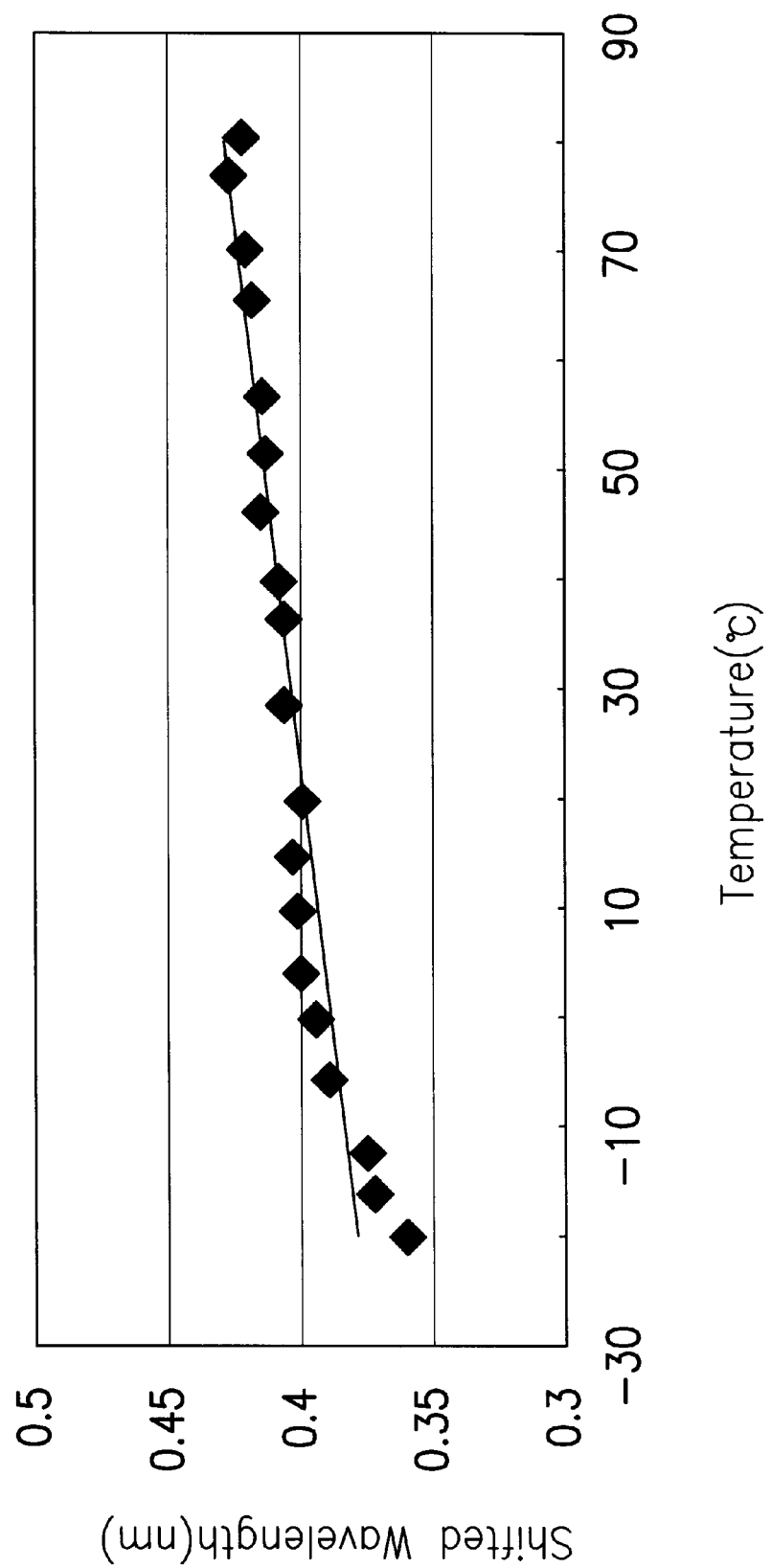
FIG. 6 is a plot of a shifted central wavelength of the passive temperature independent fiber grating as the environmental temperature varies in range of −20° C. to 80° C., according to the preferred embodiment of the invention.

According to the invention, a stable performance is achieved as shown in FIG. 6. FIG. 6 is a plot of a shifted central wavelength of the passive temperature independent fiber grating as the environmental temperature varies in range of –20° C.–80° C., according to the preferred embodiment of the invention. In FIG. 6, the data points are the measured shifted wavelength from the set central wavelength of the fiber grating. In the temperature range of about –20° C.–80° C., the shifted wavelength only varies from about 0.35 nm to 0.425 nm. The variation rate $d\lambda/dT$ is less than 1 pm/° C., while the conventional variation rate is 10 pm/° C. The shifted wavelength is sufficiently stable. For an ideal situation, the shifted wavelength is varies linearly with the temperature. In FIG. 6, the wavelength temperature coefficient at the low temperature of –20° C. is larger due distortion. The absolute quantity can be compensated without problem by a proper adjustment through the third metal layer 206 and the adjusting plate 306.

A bimetal plate is a commercial product with low price and has been widely used in industry. Its working temperature is also about between –20° C. and 80° C. with an acceptable linearity. The two layers of the bimetal plate are firmly adhered together by a conventional discharging joining method. The bimetal plate is reliable so as to assure directly the reliability of the invention.

The invention employs the bimetal plate and a third metal layer to firmly form the multi-layer metal plate. The thermal compensation can be easily adjusted by the third metal layer. The fabrication process is simple and has no extra repetitive steps. After the thermal compensation, the central wavelength of the fiber grating can easily meet the requirements of the ITU.

The passive temperature independent fiber grating package of the invention includes no ceramic material so it is not easily broken. The fiber grating package is also protected by a casing. The protection is further reinforced.

The passive temperature independent fiber grating package does not require highly precise fabrication. The dimension of the fiber grating package is also small. For the aspect of basic thermal compensation, the invention uses two plates with different CTE to achieve thermal compensation. The available bimetal plate is highly reliable. The suitable compensation of CTE is achieved by using the third metal layer, which is thin, to further precisely adjusting the curve rate of the contact surface so that grating pitch is adjusted to the desired quantity. This allows the thickness and the width of the fiber grating package to be effectively reduced.

Moreover, the adjustment of the contact length between the third metal layer and the bimetal plate is performed in an on-line manner. The location of the adjusting plate is also adjusted on-line. The yield of the fiber grating is effectively improved.

In conclusion, the method of the invention for packaging the fiber grating has several advantages as follows:

1. The invention employs a bimetal plate, which is set to be flat at a relatively high temperature. A thin metal layer is adhered to the bimetal plate with a contact length by a thermal glue.

2. The contact length is adjusted to achieve a central wavelength variation rate of less than 1 pm/° C.

3. The central wavelength of the fiber grating can be adjusted to achieve a precision of about +/–0.025 nm through the distortion of the multi-layer metal plate. As a result, the requirements for WDM communication made by the ITU are satisfied.

4. The adjusting plate between the fiber and the multi-layer metal plate is used to further precisely adjust the central wavelength of the fiber grating.

5. The fiber on each side secured between the end of the multi-layer metal plate and the end of the substrate has a reserved length at a fabrication temperature, so that the fiber is not overly stretched or broken at normal temperatures.

The fiber grating package of the invention also has several advantages as follows:

1. The multi-layer metal plate includes a bimetal plate and a thin metal layer so as to effectively compensate the CTE of the intrinsic bimetal plate.

2. The multi-layer metal plate is flat at the packaging temperature and is concave at normal temperatures.

3. The adjusting plate is inserted between the fiber and the multi-layer metal plate. The central wavelength is further precisely adjusted by adjusting the location of the adjusting plate.

It will be apparent to skill in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fiber grating package, at least comprising:
   a substrate, having two ends;
   a multi-layer metal plate, mounted on the substrate, the multi-layer metal plate comprising a first metal layer, a second metal layer, and a third metal layer, in which the first metal layer and the second metal layer form a bimetal plate, and the multi-layer metal plate has two ends; and
   an optical fiber, directly mounted on the multi-layer metal plate and secured at the two ends of the multi-layer metal plate and the two ends of the substrate, wherein a portion of the fiber between the two ends of the multi-layer metal plate comprises a fiber grating.

2. The fiber grating package of claim 1, wherein the first metal layer has a coefficient of thermal expansion (CTE) greater than a CTE of the second metal layer, and the third metal layer is adhered on the first metal layer.

3. The fiber grating package of claim 1, wherein the third metal layer is thinner than the first metal layer and the third metal layer is thinner than the second metal layer.

4. The fiber grating package of claim 1, wherein the third metal layer has an online adjustable contact length on the bimetal layer.

5. The fiber grating package of claim 1, wherein the third metal layer comprises stainless steel.

6. The fiber grating package of claim 1, wherein the third metal layer has a thickness of about 0.03 mm.

7. The fiber grating package of claim 1, wherein the multi-layer metal plate is substantially flat at about 100° C.

8. The fiber grating package of claim 1, wherein a portion of the fiber at a portion between one of the two ends of the substrate and one of the two ends of the multi-layer metal plate at same side comprises a sufficient length at a packaging temperature so as to avoid pulling as the temperature of the fiber grating package is changed from the packaging temperature.

9. The fiber grating package of claim 1, wherein the fiber grating package further comprises an adjusting plate between the fiber and the multi-layer metal plate, and located at an optimized position, within a working temperature range, between the fiber grating and one of the two ends of the multi-layer metal plate.

10. The fiber grating package of claim 1, wherein the substrate is packaged in a casing for protecting the fiber grating.

11. The fiber grating package of claim 10, wherein the casing comprises a tube-like casing, each end of which tube-like casing is covered with caps, each of the caps having an aperture through which the fiber passes.

12. An optical fiber grating package, comprising:
   a metal substrate, having two ends;
   a multi-layer metal plate, mounted on the substrate, the multi-layer metal plate comprising a first metal layer, a second metal layer, and a third metal layer, wherein the first metal layer with a first coefficient of thermal expansion (CTE) and the second metal layer with a second CTE less than the first CTE together form a bimetal plate, the third metal layer is adhered on the first metal layer by an adjustable contact length for adjusting a net CTE of the multi-layer metal plate, and the multi-layer metal plate has two ends;
   an optical fiber, mounted on the multi-layer metal plate and secured at the two ends of the multi-layer metal plate and the two ends of the substrate , wherein a portion of the fiber between the two ends of the multi-layer metal plate comprises a fiber grating; and
   an adjusting plate, located between the fiber and the multi-layer metal plate and positioned at an optimized position, within a working temperature range, between the fiber grating and one of the two ends of the multi-layer metal plate.

13. The fiber grating package of claim 12, wherein the third metal layer comprises stainless steel.

14. The fiber grating package of claim 12, wherein the third metal layer has a thickness of about 0.03 mm.

15. The fiber grating package of claim 12, wherein the multi-layer metal plate is substantially flat at about 100° C.

16. The fiber grating package of claim 12, wherein the fiber at a portion between the substrate fixing ends and the metal-plate fixing ends comprises a sufficiently loose length at 100° C. so as to avoid overly stretching and breaking as the temperature of the fiber grating package changes.

17. The fiber grating package of claim 12, wherein the substrate is packaged in a casing for protecting the fiber grating.

18. The fiber grating package of claim 12, wherein the casing comprises a tube-like casing, each end of which tube-like casing is covered with caps, each of the caps having an aperture through which the fiber passes.

19. A method for fabricating an optical fiber grating, the method comprising:
   providing a bimetal plate, which comprises a first metal layer and a second metal layer, the first metal layer having a greater coefficient of thermal expansion (CTE) than that of the second metal layer;
   setting the bimetal plate to be approximately flat at a packaging temperature, and adhering a contact length of a third metal layer onto the bimetal plate so as to form a multi-layer metal plate, wherein the contact length is used to adjust a net CTE of the multi-layer metal plate;
   at the packaging temperature, mounting a fiber grating of a fiber on the multi-layer metal plate and securing the fiber to two ends of the multi-layer metal plate;
   adjusting a central wavelength of the fiber grating and the contact length at the packaging temperature; and
   mounting the multi-layer metal plate on a substrate, and securing the fiber other than the fiber grating portion to two substrate ends, wherein a fiber length between the two substrate ends and the two ends of the multi-layer metal plate at both sides is sufficiently long so as to avoid excessive pulling and breakage.

20. The method of claim 19, wherein the packaging temperature is about 100° C.

21. The method of claim 19, wherein the method further comprises placing an adjusting plate between the multi-layer metal plate and the fiber, and at an optimized position between the fiber grating and one of the two ends of the multi-layer metal plate, so that the central wavelength is further precisely adjusted.

22. The method of claim 19, wherein after the step of mounting the multi-layer metal plate on a substrate, the method further comprises:
   mounting the substrate with the multi-layer metal plate and the fiber grating in a tube-like casing, and covering both ends of the tube-like casing with caps.

23. A fiber grating package, at least comprising:
   a substrate, having two first attach locations on a surface of the substrate;
   a multi-layer metal plate, having two second attach locations and mounted on the surface of the substrate, the multi-layer metal plate comprising a first metal layer, a second metal layer, and a third metal layer adhered on the first metal layer by an adjustable contact length for adjusting the thermal expansion of the multi-layer metal plate; and
   an optical fiber, directly mounted on the multi-layer metal plate and secured at the two second attach locations of the multi-layer metal plate and at the two first attach locations of the substrate, wherein a portion of the fiber between the two second attach locations of the multi-layer metal plate comprises a fiber grating.

* * * * *